US010205776B2

(12) United States Patent
Liang et al.

(10) Patent No.: US 10,205,776 B2
(45) Date of Patent: Feb. 12, 2019

(54) METHOD AND DEVICE FOR WIRELESS CONNECTION

(71) Applicant: Xiaomi Inc., Beijing (CN)

(72) Inventors: Xin Liang, Beijing (CN); Ping Wu, Beijing (CN); Xin Liu, Beijing (CN); Bo Liu, Beijing (CN); Guizhou Wu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 279 days.

(21) Appl. No.: 14/829,603

(22) Filed: Aug. 18, 2015

(65) Prior Publication Data
US 2016/0182624 A1 Jun. 23, 2016

Related U.S. Application Data

(63) Continuation of application No. PCT/CN2015/078015, filed on Apr. 30, 2015.

(30) Foreign Application Priority Data

Dec. 23, 2014 (CN) .......................... 2014 1 0810616

(51) Int. Cl.
H04L 29/08 (2006.01)
H04L 29/06 (2006.01)
(Continued)

(52) U.S. Cl.
CPC .......... *H04L 67/1046* (2013.01); *H04L 12/12* (2013.01); *H04L 63/083* (2013.01);
(Continued)

(58) Field of Classification Search
CPC ... H04W 84/12; H04W 4/008; H04W 76/023; H04W 76/00; H04W 76/043;
(Continued)

(56) References Cited

U.S. PATENT DOCUMENTS 9,918,250 B2 * 3/2018 Liu .......................... H04L 69/08
2007/0186105 A1 * 8/2007 Bailey ................. H04L 63/0492
713/168
(Continued)

FOREIGN PATENT DOCUMENTS

CN 103096506 A 5/2013
CN 103327644 A 9/2013
(Continued)

OTHER PUBLICATIONS

Extended European search report for EP15201428.8.
International search report for PCT/CN2015/078015.

*Primary Examiner* — S M Rahman
*Assistant Examiner* — Ranjan Pant
(74) *Attorney, Agent, or Firm* — Jun He Law Offices P.C.; James J. Zhu

(57) ABSTRACT

According to the embodiments of the present disclosure, a first terminal device may create a peer-to-peer (P2P) group, and then determine a Service Set Identifier (SSID) and a connection password of the P2P group, and then send the SSID and the connection password to a second terminal device so that the second terminal device is able to connect to the first terminal device according to the SSID and the connection password. In this way, prior to establishment of the wireless connection, the second terminal device may acquire the SSID and the connection password of the P2P group created by the first terminal device, thus second terminal device may directly use the SSID and the connection password to connect to the first terminal device without cumbersome discovery and negotiation processes as used in establishment of a conventional P2P connection.

18 Claims, 12 Drawing Sheets

(51) Int. Cl.
*H04W 12/06* (2009.01)
*H04L 12/12* (2006.01)
*H04L 12/28* (2006.01)

(52) U.S. Cl.
CPC ............. *H04L 67/16* (2013.01); *H04W 12/06* (2013.01); *H04L 12/2803* (2013.01); *H04L 63/065* (2013.01); *H04L 63/104* (2013.01)

(58) Field of Classification Search
CPC ..... H04W 88/12; H04W 76/02; H04W 40/24; H04W 8/005; H04W 76/025; H04W 48/16; H04W 76/021; H04W 84/22; H04W 76/14; H04W 84/18; H04W 92/18; H04W 4/80; H04W 4/08; H04W 76/10; H04W 48/20; H04W 40/246; H04W 76/15; G06F 3/1236; G06F 3/129; G06F 3/1454; G06F 3/1423; H04N 21/43637; H04N 21/4108; H04N 21/2385; G06K 15/405; H04L 61/2015; H04L 67/1046; H04L 67/1044; H04L 65/4076
See application file for complete search history.

(56) References Cited

U.S. PATENT DOCUMENTS

| | | | |
|---|---|---|---|
| 2010/0020746 A1* | 1/2010 | Zaks ................. | G06Q 30/02 370/328 |
| 2012/0155350 A1* | 6/2012 | Wentink ............. | H04W 8/005 370/311 |
| 2012/0205431 A1* | 8/2012 | Chang ............... | H04N 1/00334 235/375 |
| 2012/0265913 A1 | 10/2012 | Suumaeki et al. | |
| 2013/0223279 A1 | 8/2013 | Tinnakornsrisuphap et al. | |
| 2013/0276075 A1 | 10/2013 | Gong et al. | |
| 2014/0085666 A1* | 3/2014 | Park ................... | G06K 15/405 358/1.15 |
| 2014/0169219 A1* | 6/2014 | Suzuki ............... | H04W 12/06 370/254 |
| 2014/0206285 A1* | 7/2014 | Jance ................. | H04W 76/15 455/41.2 |
| 2014/0233549 A1* | 8/2014 | Kim ................... | H04W 76/14 370/338 |
| 2014/0240776 A1* | 8/2014 | Suzuki ............... | G06F 3/1296 358/1.15 |
| 2014/0287690 A1* | 9/2014 | Kim ................... | H04W 4/008 455/41.3 |
| 2014/0362735 A1 | 12/2014 | Mahaffy et al. | |
| 2014/0362841 A1* | 12/2014 | Shibata .............. | H04W 48/18 370/338 |
| 2015/0117318 A1* | 4/2015 | Qi ...................... | H04W 76/18 370/329 |
| 2015/0148104 A1* | 5/2015 | Friedl ................. | G06Q 20/145 455/561 |
| 2015/0288719 A1* | 10/2015 | Freudiger ........... | H04L 63/20 726/12 |
| 2015/0312394 A1* | 10/2015 | Mirza ................ | H04M 1/7253 455/420 |
| 2016/0027399 A1* | 1/2016 | Wilde ................. | G06F 13/382 345/520 |
| 2016/0057791 A1* | 2/2016 | Su ..................... | H04W 12/06 370/328 |
| 2016/0112901 A1* | 4/2016 | Liu .................... | H04L 69/08 370/310 |
| 2016/0219423 A1* | 7/2016 | Lee .................... | H04W 8/005 |
| 2016/0302026 A1* | 10/2016 | Lee .................... | H04W 76/14 |
| 2018/0184294 A1* | 6/2018 | Liu .................... | H04L 1/0079 |

FOREIGN PATENT DOCUMENTS

| | | | |
|---|---|---|---|
| CN | 103415013 A | | 11/2013 |
| CN | 103765981 A | | 4/2014 |
| CN | 103825788 A | | 5/2014 |
| CN | 104221467 A | | 12/2014 |
| CN | 104469789 | * | 3/2015 |
| EP | 2611079 A1 | | 7/2013 |
| JP | 2007-531456 A | | 11/2007 |
| JP | 6186090 B2 | | 8/2017 |
| KR | 10-2012-0099995 A | | 9/2012 |
| KR | 10-2013-0016609 A | | 2/2013 |
| KR | 10-2014-0052690 A | | 5/2014 |
| WO | 2013/095394 A1 | | 6/2013 |
| WO | 2013/153925 A1 | | 10/2013 |

* cited by examiner

METHOD AND DEVICE FOR WIRELESS CONNECTION

CROSS-REFERENCE TO RELATED APPLICATIONS

This application is a Continuation application of International Application PCT/CN2015/078015, with an international filing date of Apr. 30, 2015, which is based on and claims priority to Chinese Patent Application No. 201410810616.5, filed on Dec. 23, 2014, the entire contents of which are incorporated herein by reference.

TECHNICAL FIELD

The present disclosure generally relates to the technical field of wireless connection between terminal devices, and more particularly, to a method and device for a wireless connection.

BACKGROUND

With the development of technology, people wish to be able to get rid of complex cable and connection steps required for the interconnection between terminal devices, such as mobile phones and smart televisions, and etc., and to simplify the connection method between the different terminal devices, thus enabling a fast and convenient content sharing, such as screen sharing, between different devices. In related art, a conventional peer-to-peer (P2P) connection may be established between a mobile phone and a smart television for data transmission, or a wireless network may be created by the mobile phone before accessed by the smart television for data transmission.

SUMMARY

The present disclosure provides a method and device for establishing a wireless connection.

According to a first aspect of the embodiments of the present disclosure, a method for establishing a wireless connection in a first terminal device is provided, including: creating a peer-to-peer (P2P) group; determining a Service Set Identifier (SSID) and a connection password of the P2P group; and sending the SSID and the connection password to a second terminal device so that the second terminal device is able to connect to the first terminal device according to the SSID and the connection password.

According to a second aspect of the embodiments of the present disclosure, a method for establishing a wireless connection in a second terminal device is provided, including: generating an SSID and a connection password; displaying the SSID and the connection password in a predetermined manner so that the first terminal device is able to acquire the SSID and the connection password to create a P2P group according to the SSID and the connection password; and connecting with the P2P group created by the first terminal device according to the SSID and the connection password.

According to a third aspect of the embodiments of the present disclosure, a method for establishing a wireless connection in a first terminal device is provided, including: acquiring an SSID and a connection password provided by the second terminal device; creating a P2P group; and setting an SSID and a connection password of the P2P group as the SSID and the connection password provided by the second terminal device so that the second terminal device is able to connect to the first terminal device according to the SSID and the connection password.

According to a fourth aspect of the embodiments of the present disclosure, a first terminal device for establishing a wireless connection is provided, including: a processor; and a memory configured to store instructions executable by the processor; herein, the processor is configured to: create a P2P group; determine an SSID and a connection password of the P2P group; and send the SSID and the connection password to a second terminal device so that the second terminal device is able to connect to the device according to the SSID and the connection password.

According to an fifth aspect of the embodiments of the present disclosure, a second terminal device for establishing a wireless connection is provided, including: a processor; and a memory configured to store instructions executable by the processor; herein, the processor is configured to: generate an SSID and a connection password; display the SSID and the connection password in a predetermined manner so that the first terminal device is able to acquire the SSID and the connection password to create a P2P group according to the SSID and the connection password; and connect with the P2P group created by the first terminal device according to the SSID and the connection password.

According to a sixth aspect of the embodiments of the present disclosure, a first terminal device for establishing a wireless connection is provided, including: a processor; and a memory configured to store instructions executable by the processor; herein, the processor is configured to: acquire an SSID and a connection password provided by the second terminal device; create a P2P group; and set an SSID and a connection password of the P2P group as the SSID and the connection password provided by the second terminal device so that the second terminal device is able to connect to the first terminal device according to the SSID and the connection password.

The technical solution according to embodiments of the disclosure may achieve the following advantageous effects:

In the embodiments of the present disclosure, the first terminal device (taking a mobile terminal as an example) may create a P2P group, and then send the SSID and the connection password of the P2P group to the second terminal device (taking a smart television as an example), or set the SSID and the connection password of the P2P group as an SSID and a connection password provided by the smart television. Prior to connection, both the SSID and the connection password have been transmitted, and the smart television may acquire the SSID and the connection password of the P2P group created by the mobile terminal, thus the SSID and the connection password may be used to directly connect the smart television with the terminal equipment without cumbersome search and negotiation processes in establishment of a conventional P2P connection. Furthermore, it is unnecessary for the mobile terminal side to disconnect from the original wireless connection due to the establishment of the P2P group.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
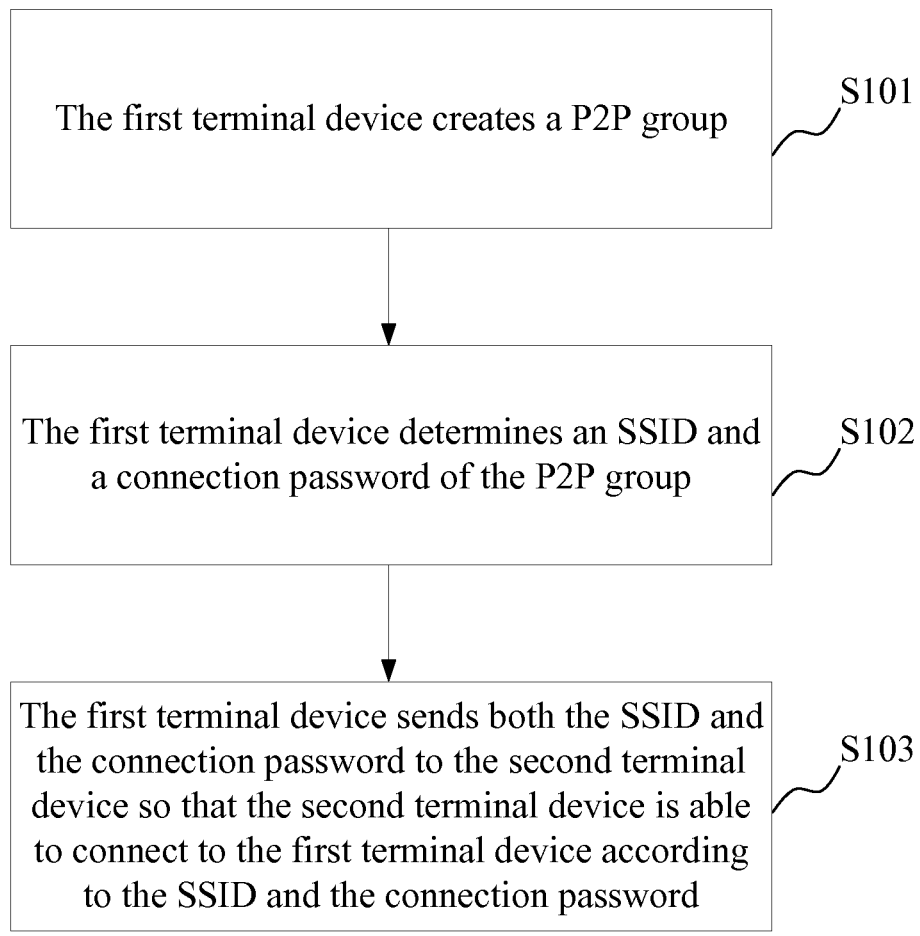
FIG. 1 is a flow chart showing a method for establishing a wireless connection according to an exemplary embodiment.

FIG. 1 is a flow chart showing a method for establishing a wireless connection according to an exemplary embodiment. The method may be applied to a first terminal device, for example, a mobile terminal such as a mobile phone, a tablet computer and the like. Referring to FIG. 1, the method may include following steps.

In Step S101, the first terminal device creates a P2P group.

In the present embodiment, the P2P group needs to be created firstly by the first terminal device. The P2P group may be regarded as a hot spot. Nevertheless, it is unnecessary to disconnect an existing wireless connection of the first terminal device for creating the P2P group. For example, in a scenario, the first terminal device is connected to an external network through WiFi and expected to share videos of the external network for a second terminal device. The first terminal device has to be disconnected from the external network originally connected if the first terminal device creates an Access Point (AP) on which the second terminal device can be logged. However, in this case, video sharing makes no sense. In the present embodiment, what is created by the first terminal device is a P2P group, thus the problem of network disconnection will not occur, naturally not affecting video sharing.

In Step S102, both a service set identifier (SSID) and a connection password of the P2P group are determined by the first terminal device.

In Step S103, the first terminal device sends both the SSID and the connection password to the second terminal device so that the second terminal device is able to connect to the first terminal device according to the SSID and the connection password.

Figure 2:
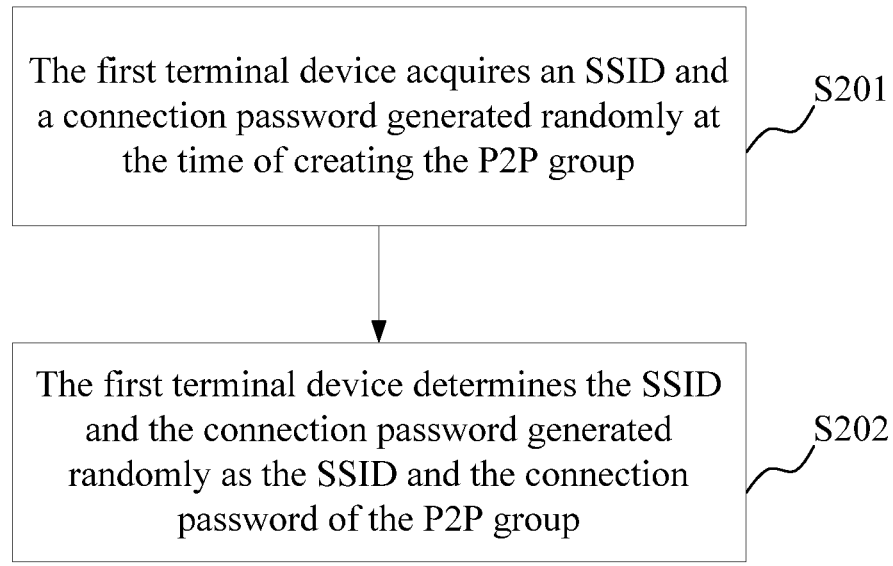
FIG. 2 is a flow chart showing a method for establishing a wireless connection according to an exemplary embodiment.
Figure 3:
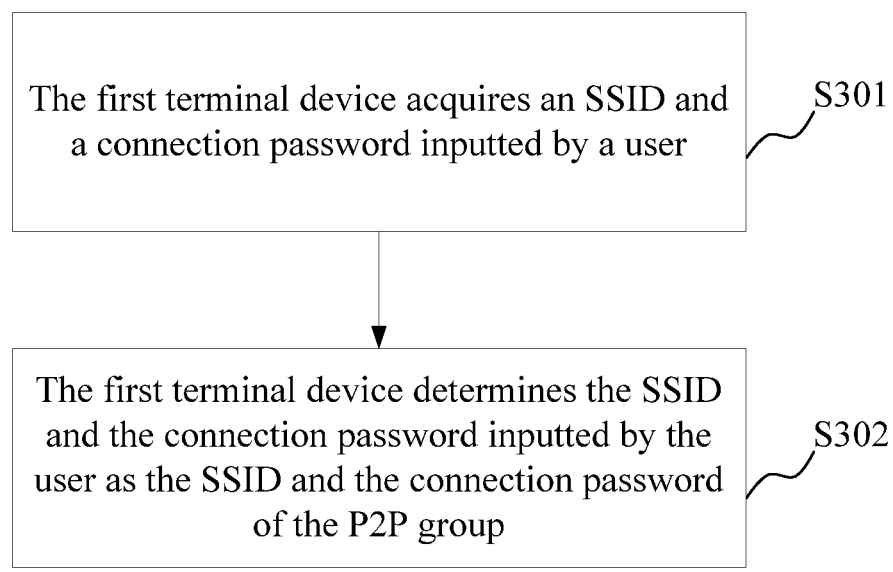
FIG. 3 is a flow chart showing a method for establishing a wireless connection according to an exemplary embodiment.

Referring to FIGS. 2~3, in the present embodiment or other embodiments of the present disclosure, the step of determining both the SSID and the connection password of the P2P group may include following steps.

In Step S201, an SSID and a connection password generated randomly at the time of creating the P2P group are acquired by the first terminal device.

In Step S202, the SSID and the connection password generated randomly are determined by the first terminal device as the SSID and the connection password of the P2P group.

Or following steps may be included.

In Step S301, an SSID and a connection password inputted by a user are acquired by the first terminal device.

In Step S302, the first terminal device determines the SSID and the connection password inputted by the user as the SSID and the connection password of the P2P group.

Figure 4:
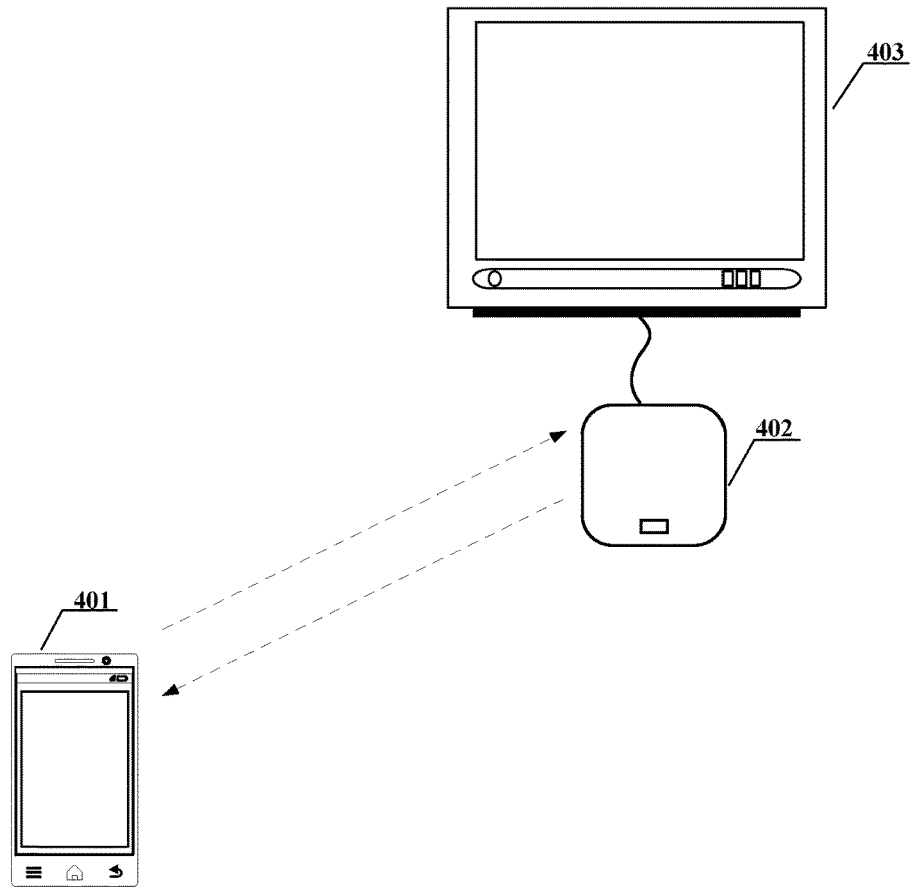
FIG. 4 is a schematic diagram showing a scenario in which a smart television is connected with a mobile phone according to an exemplary embodiment.

A scenario may be referred to as shown by FIG. 4. In FIG. 4, a first terminal device 401, in particular, may represent a mobile phone; a second terminal device 402, in particular, in particular, may be a smart TV box; a conventional television 403 is connected with the smart TV box 402. After creating a P2P group, the mobile phone 401 sends both an SSID and a connection password of the P2P group to the smart TV box 402. The smart TV box 402 may connect to the mobile phone 401 in wireless using the SSID and the connection password.

After the wireless connection is established, interaction such as standard RTSP (Real-time Transport Streaming Protocol) may be progressed between both sides. A procedure of subsequent data transmission after the connection is established may be referred to Miracast™ technology, which is not repeated in the present embodiment.

Examples of methods the first terminal device sends the SSID and the connection password to the second terminal device are provided in the present disclosure, but are not intended to limit its scope. For example, in the present embodiment or other embodiments of the present disclosure, the step of sending both the SSID and the connection password to the second terminal device may include following methods.

The first terminal device directly may send both the SSID and the connection password to the second terminal device through a same LAN in which both the first and second terminal devices are located.

Alternatively, the first terminal device may send both the SSID and the connection password to the second terminal device through a Bluetooth connection.

Alternatively, the first terminal device may send both the SSID and the connection password to the second terminal device through a NFC (Near Field Communication) connection.

Alternatively, the first terminal device may send both the SSID and the connection password to the second terminal device by broadcasting a WIFI frame, and both the SSID and the connection password are placed in a preset field of the WIFI frame.

Regarding the last case, as an example, the WIFI frame may be a Probe Request. The Probe Request is configured to scan 802.11 networks which are available in the area at present. The device may send an active Probe Request and wait for a Probe Response from an AP to discover the AP. The first terminal device may place the SSID and the connection password in an SSID filed of the Probe Request and then broadcast the Probe Request. Thus, no connection needs to be established between the first terminal device and the second terminal device in advance. The second terminal device is only required to listen. After detecting the Probe Request sent by the first terminal device, the second terminal device may parse the SSID and the connection password from the SSID filed of the Probe Request.

Figure 5:
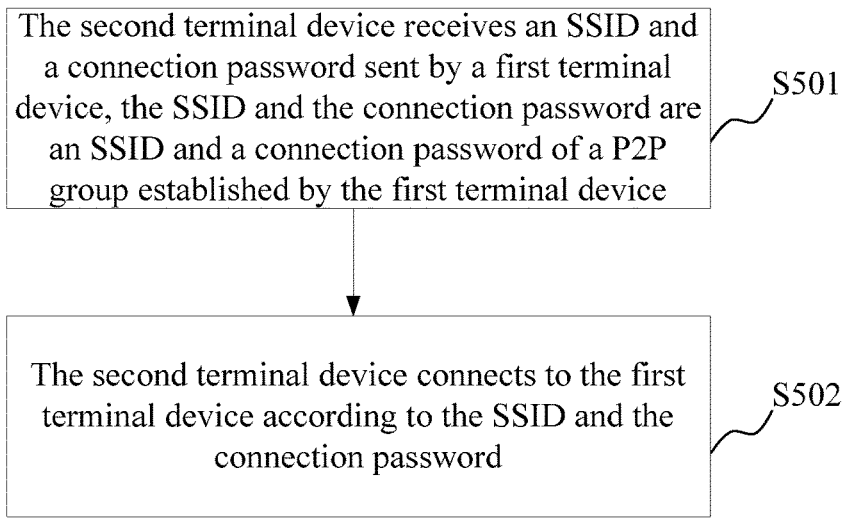
FIG. 5 is a flow chart showing a method for establishing a wireless connection according to an exemplary embodiment.

FIG. 5 is a flow chart showing a method for establishing a wireless connection according to an exemplary embodiment. The method may be applied to a second terminal device, for example, a smart television, a smart TV box or a smart sound box, etc. Referring to FIG. 5, the method may include following steps.

In Step S501, the second terminal device receives an SSID and a connection password sent by a first terminal device, the SSID and the connection password are an SSID and a connection password of a P2P group created by the first terminal device.

In Step S502, the second terminal device connects to the first terminal device according to the SSID and the connection password.

In the present embodiment or other embodiments of the present disclosure, the step of receiving both the SSID and the connection password sent by the first terminal device may include following ways.

The second terminal device may receive both the SSID and the connection password directly sent by the first terminal device through a same LAN.

Alternatively, the second terminal device may receive both the SSID and the connection password through a Bluetooth connection.

Alternatively, the second terminal device may receive both the SSID and the connection password through a NFC connection.

Alternatively, the second terminal device may listen for a WIFI frame and acquiring the SSID and the connection password by parsing the WIFI frame detected, herein both the SSID and the connection password are placed in a preset field of the WIFI frame.

Figure 6:
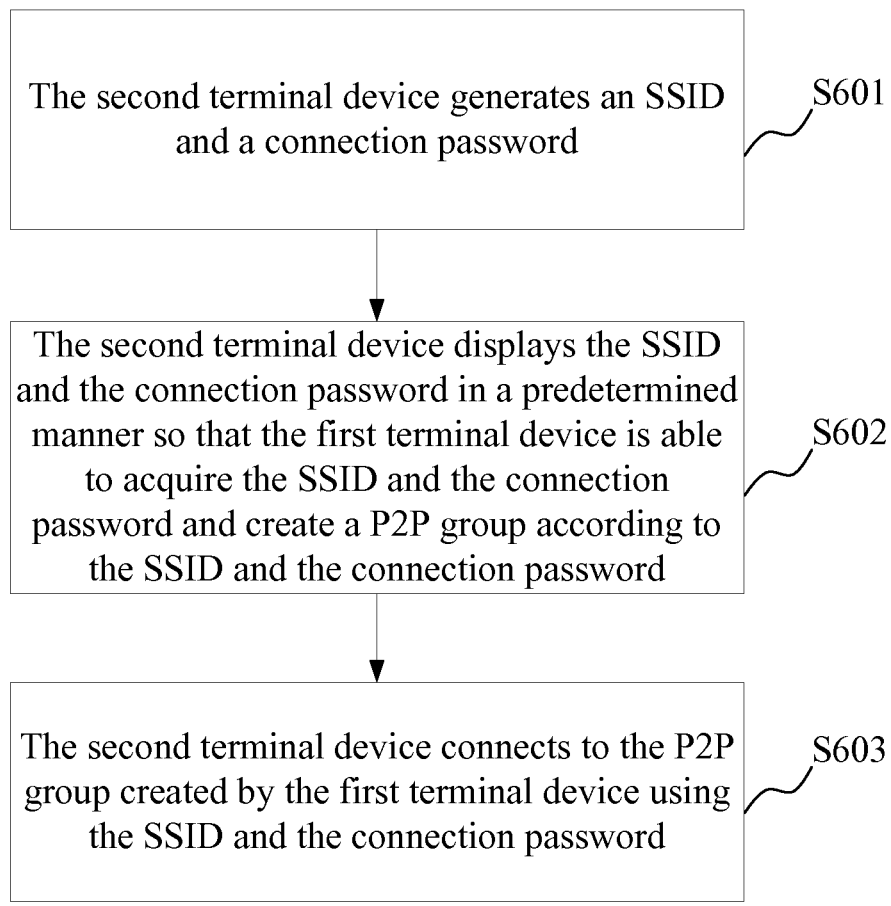
FIG. 6 is a flow chart showing a method for establishing a wireless connection according to an exemplary embodiment.

FIG. 6 is a flow chart showing a method for establishing a wireless connection according to an exemplary embodiment. The method may be applied to a second terminal device, for example, a smart television, a smart TV box or a smart sound box, etc. Referring to FIG. 6, the method may include following steps.

In Step S601, the second terminal device generates an SSID and a connection password.

In the present embodiment, a P2P group is also created by the first terminal device, through which the second terminal device connects to the first terminal device. However, either the SSID or the connection password of the P2P group created by the first terminal device is not determined by the first terminal device, in stead, they are determined by the second terminal device. In other words, the P2P group is created by the first terminal device according to the SSID and the connection password known to the second terminal device. The second terminal device may directly connects to the first terminal device without steps such as discovery or negotiation, thus simplifying a process of establishing the wireless connection between both sides.

Both the SSID and the connection password known to the second terminal device may be acquired by a plurality of ways. For example, they may be randomly generated by a pre-defined random algorithm. Examples of ways for acquiring the SSID and the connection password known to the second terminal device are provided in the present disclosure, but are not intended to limit its scope.

As an example, in the present embodiment or other embodiments of the present disclosure, the step of acquiring an SSID and a connection password known to the second terminal device may include following ways.

The SSID and the connection password may be preset or randomly generated in the second terminal device.

Alternatively, the SSID and the connection password may be inputted by a user of the second terminal device.

In other words, the SSID and the connection password may either be set by the user of the second terminal device, or be preset in the second terminal device, for example, the SSID may be a serial number of the second terminal device, and the connection password may be preset as "123456", etc.

In Step S602, the second terminal device displays the SSID and the connection password in a predetermined manner so that the first terminal device is able to acquire the SSID and the connection password and create a P2P group according to the SSID and the connection password.

For example, the step of displaying the SSID and the connection password in a predetermined manner may include following substeps.

In substep 1, the SSID and the connection password are displayed on a screen of the second terminal device in a form of a two-dimensional barcode.

In substep 2, the second terminal device displays the two-dimensional barcode on its own screen, and the first terminal device may acquire the SSID and the connection password by scanning and parsing the two-dimensional barcode. By this means, it is convenient to transmit the SSID and the connection password without establishing any connection between both terminal devices in advance.

In Step S603, the second terminal device connects to the P2P group created by the first terminal device using the SSID and the connection password.

Figure 7:
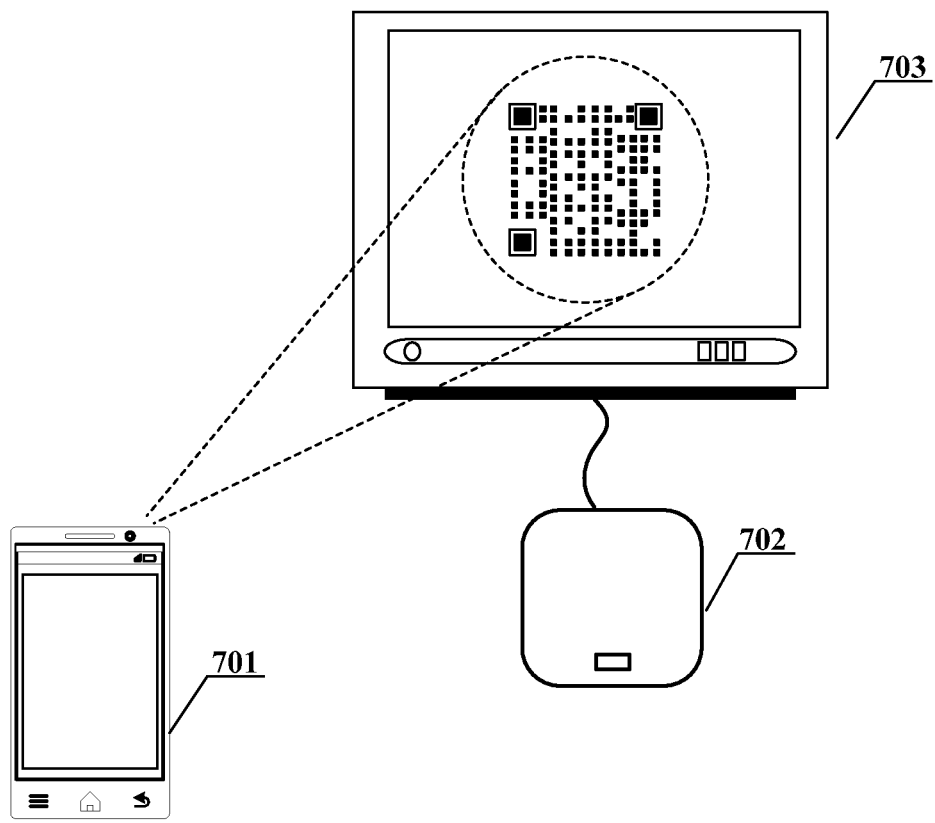
FIG. 7 is a schematic diagram showing scenario in which a smart television is connected with a mobile phone according to an exemplary embodiment.

FIG. 7 shows an exemplary scenario. In FIG. 7, a first terminal device 701, in particular, may be a mobile phone; a second terminal device 702, in particular, may be a smart TV box; and 703 may be a conventional television. The smart TV box 702 generates a two-dimensional barcode and displays it on the television 703, and the mobile phone 701 acquires the SSID and the connection password by scanning the two-dimensional barcode.

Figure 8:
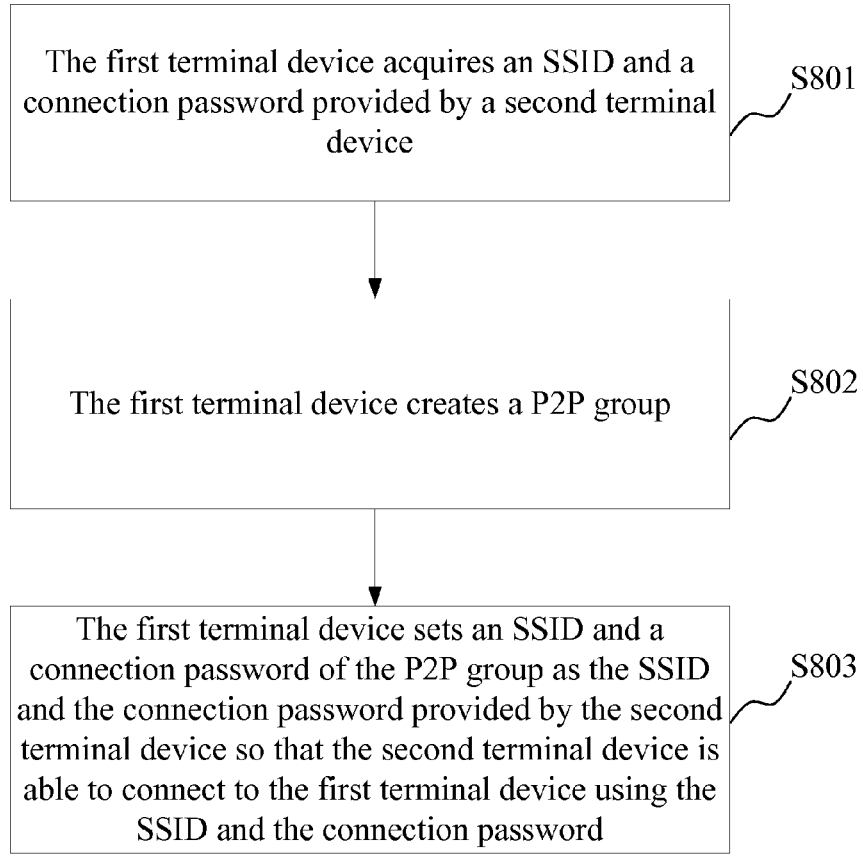
FIG. 8 is a flow chart showing a method for establishing a wireless connection according to an exemplary embodiment.

FIG. 8 is a flow chart showing a method for establishing a wireless connection according to an exemplary embodiment. The method may be applied to a first terminal device, for example, a mobile terminal such as a mobile phone, a tablet computer and the like. Referring to FIG. 8, the method may include following steps.

In Step S801, the first terminal device acquires an SSID and a connection password provided by the second terminal device.

In Step S802, the first terminal device creates a P2P group.

It should be explained that the order of Steps S801 and S802 is exemplary only and should not be regarded as a limitation to the scope of the present disclosure.

In Step S803, the first terminal device sets an SSID and a connection password of the P2P group as the SSID and the connection password provided by the second terminal device so that the second terminal device is able to connect to the first terminal device using the SSID and the connection password.

Figure 9:
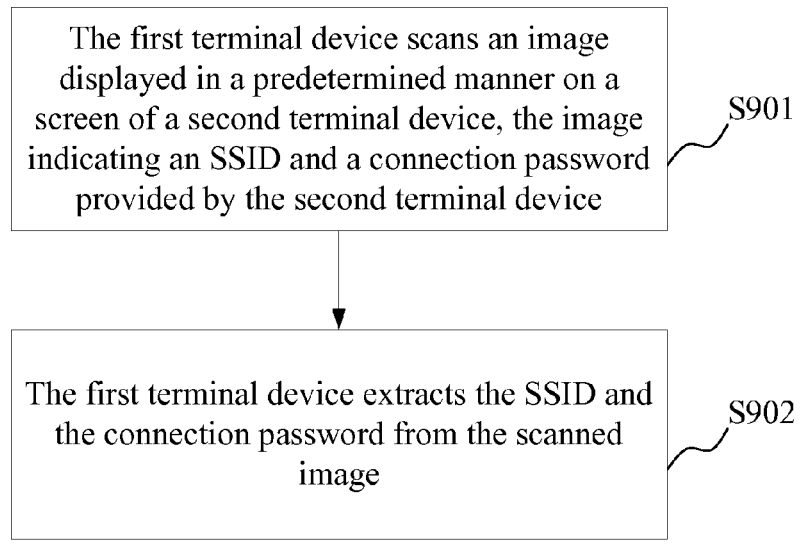
FIG. 9 is a flow chart showing a method for establishing a wireless connection according to an exemplary embodiment.

Referring to FIG. 9, in the present embodiment or other embodiments of the present disclosure, the step of acquiring the SSID and the connection password provided by the second terminal device may include following steps.

In Step S901, the first terminal scans an image displayed in a predetermined manner on a screen of the second terminal device, and the image is used to indicate the SSID and the connection password provided by the second terminal device. As an example, the image may be a two-dimensional barcode.

In Step S902, the first terminal device extracts the SSID and the connection password from the scanned image.

Further description of the technical solution of the present disclosure will be made in combination with a specific scenario.

Figure 10:
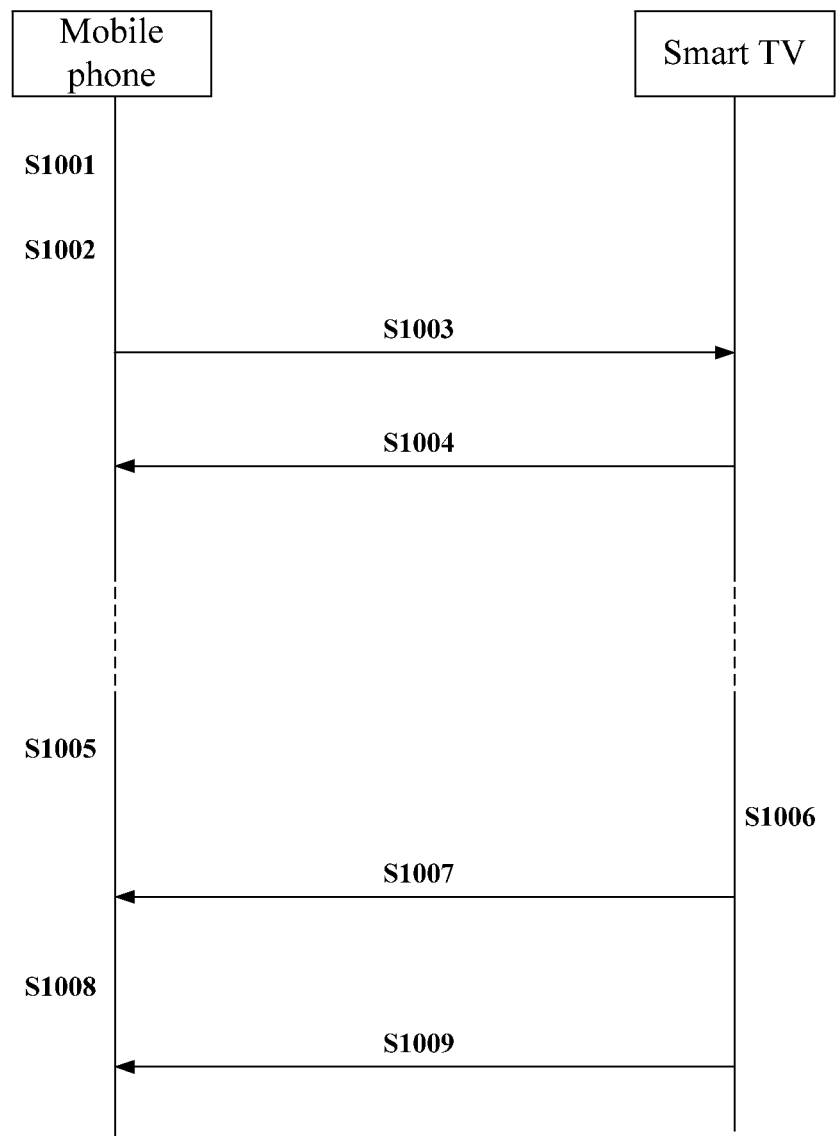
FIG. 10 is a signaling diagram showing a method for connection according to an exemplary embodiment.

FIG. 10 is a signaling diagram showing a method for establishing a wireless connection according to an exemplary embodiment. In the present embodiment, the first terminal device is a mobile phone, and the second terminal device is a smart television.

In Step S1001, the mobile phone creates a P2P group 1.

The P2P group may be created, for example, by using a P2P_GROUP_ADD persistent command in Linux™. Regarding a mobile phone with an Android system, establishment of the P2P group may be implemented by calling an upper-layer interface 'p2pGroupAdd'.

In Step S1002, the mobile phone determines an SSID and a connection password of the P2P group 1.

In Step S1003, the mobile phone sends the SSID and the connection password of the P2P group 1 to the smart television.

In Step S1004, a connection is established between the smart television and the mobile phone using the SSID and the connection password.

In Step S1005, the mobile phone creates a P2P group 2 in another connection when required.

In Step S1006, the smart television provides an SSID and a connection password of the P2P group 2, and displays both on its screen in form of a two-dimensional barcode.

In Step S1007, the mobile phone acquires the SSID and the connection password by scanning the two-dimensional barcode.

In Step S1008, the mobile phone configures the P2P group 2 using the SSID and the connection password.

In Step S1009, the smart television establishes a wireless connection with the mobile phone using the SSID and the connection password.

Figure 11:
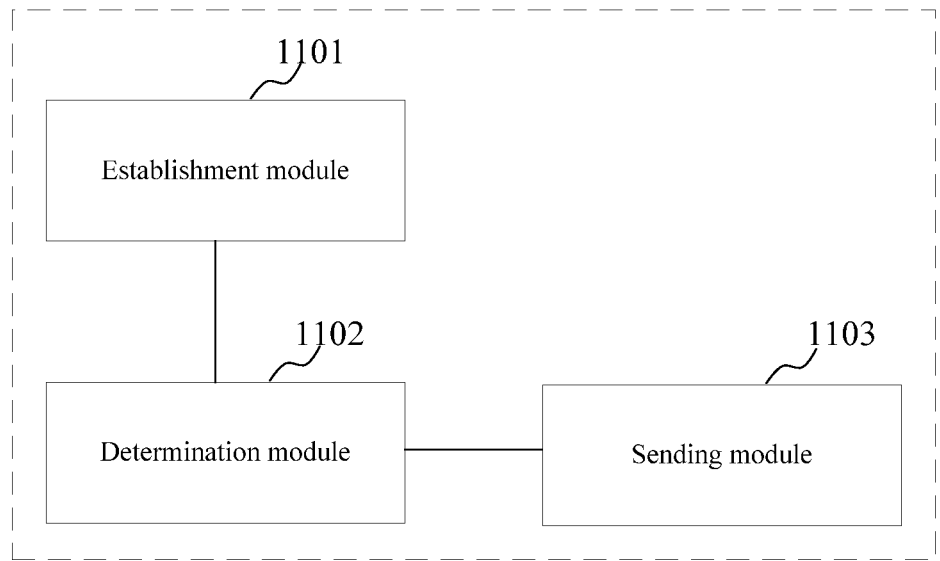
FIG. 11 is a block diagram showing an apparatus for establishing a wireless connection according to an exemplary embodiment.

FIG. 11 is a block diagram showing an apparatus for establishing a wireless connection according to an exemplary embodiment. The apparatus may be applied to a first terminal device. Referring to FIG. 11, the apparatus includes: an establishment module 1101 configured to create a P2P group; a determination module 1102 configured to determine an SSID and a connection password of the P2P group; and a sending module 1103 configured to send both the SSID and the connection password to the second terminal device so that the second terminal device is able to connect to a first terminal device using the SSID and the connection password.

Figure 12:
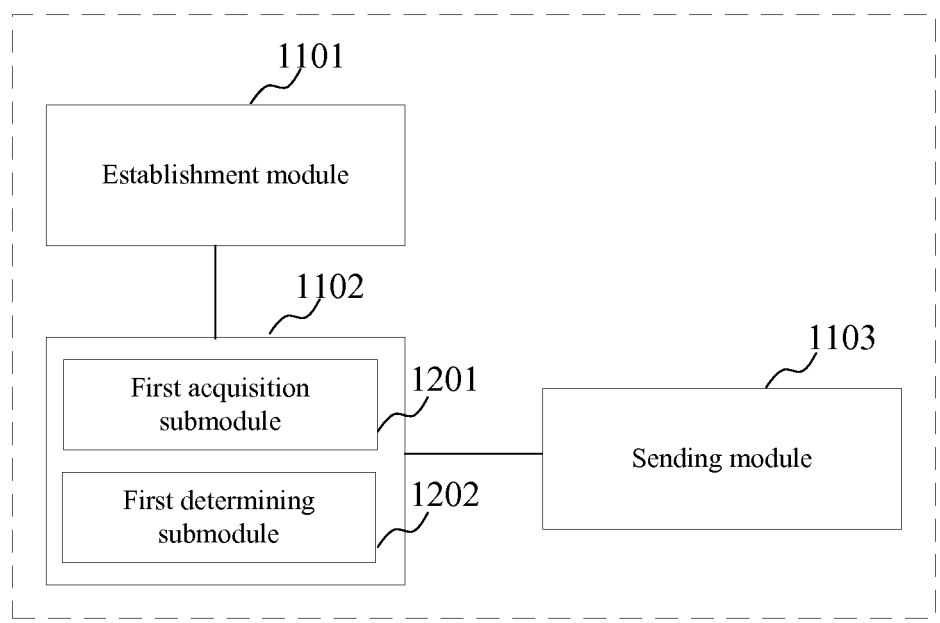
FIG. 12 is a block diagram showing an apparatus for establishing a wireless connection according to an exemplary embodiment.

Referring to FIG. 12, in the present embodiment or other embodiments of the present disclosure, the determination module 1102 may include: a first acquisition submodule 1201 configured to acquire an SSID and a connection password generated randomly at the time of creating the P2P group; and a first determining submodule 1202 configured to determine the SSID and the connection password generated randomly as the SSID and the connection password of the P2P group.

Figure 13:
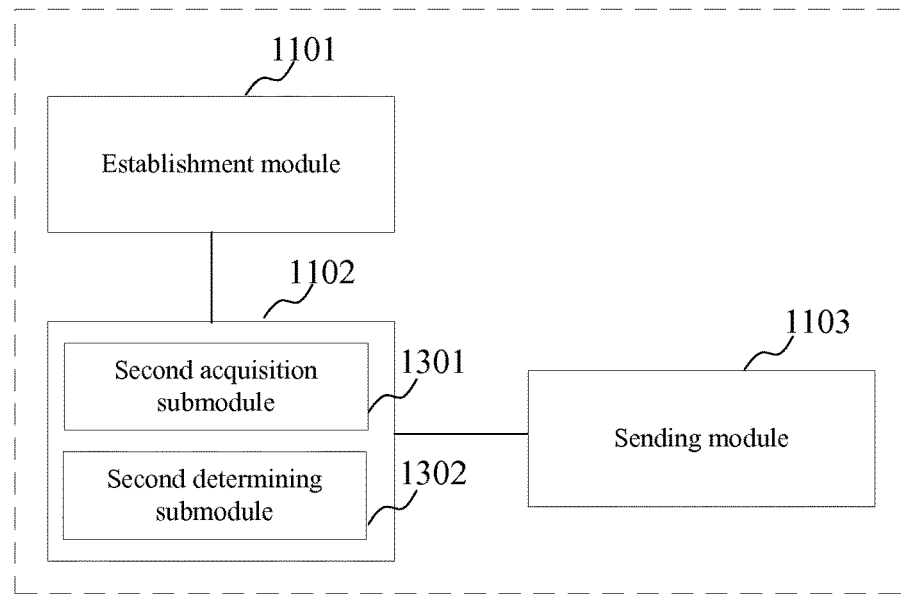
FIG. 13 is a block diagram showing an apparatus for establishing a wireless connection according to an exemplary embodiment.

Alternatively, referring to FIG. 13, in the present embodiment or other embodiments of the present disclosure, the determination module 1102 may include: a second acquisition submodule 1301, configured to acquire an SSID and a connection password inputted by a user, and a second determining submodule 1302 configured to determine the SSID and the connection password inputted by the user as the SSID and the connection password of the P2P group.

In the present embodiment or other embodiments of the present disclosure, the sending module may be configured to directly send both the SSID and the connection password to the second terminal device through a same LAN.

Alternatively, the sending module may be configured to send both the SSID and the connection password to the second terminal device through a Bluetooth connection.

Alternatively, the sending module may be configured to send both the SSID and the connection password to the second terminal device through a NFC connection.

Alternatively, the sending module may be configured to send both the SSID and the connection password to the second terminal device through broadcasting a WIFI frame, and both the SSID and the connection password are placed in a preset field of the WIFI frame.

With regard to the apparatus in the above embodiment, detailed description of specific modes for conducting operation of modules has been made in the related method embodiment, thus, detailed illustration will be omitted herein.

Figure 14:
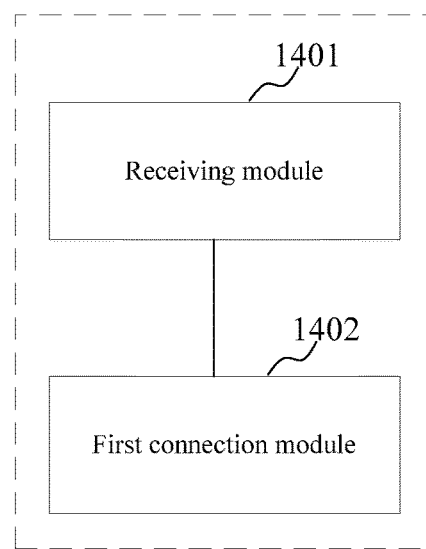
FIG. 14 is a block diagram showing an apparatus for establishing a wireless connection according to an exemplary embodiment.

FIG. 14 is a block diagram showing an apparatus for establishing a wireless connection according to an exemplary embodiment. The apparatus may be applied to a second terminal device. Referring to FIG. 14, the apparatus includes: a receiving module 1401 configured to receive an SSID and a connection password sent by the a terminal device, herein the SSID and the connection password are an SSID and a connection password of a P2P group created by the first terminal device; and a first connection module 1402 configured to connect the first terminal device using the SSID and the connection password.

In the present embodiment or other embodiments of the present disclosure, the receiving module 1401 may be configured to receive both the SSID and the connection password directly sent by the first terminal device through a same LAN in which both the first and the second terminal device locates.

Alternatively, the receiving module 1401 may be configured to receive both the SSID and the connection password through a Bluetooth connection.

Alternatively, the receiving module 1401 may be configured to receive both the SSID and the connection password through a NFC connection.

Alternatively, the receiving module 1401 may be configured to listen for a WIFI frame and acquire the SSID and the connection password by parsing the WIFI frame detected, herein both the SSID and the connection password are placed in a preset field of the WIFI frame.

With regard to the apparatus in the above embodiment, detailed description of specific modes for conducting operation of modules has been made in the related method embodiment, thus, detailed illustration will be omitted herein.

Figure 15:
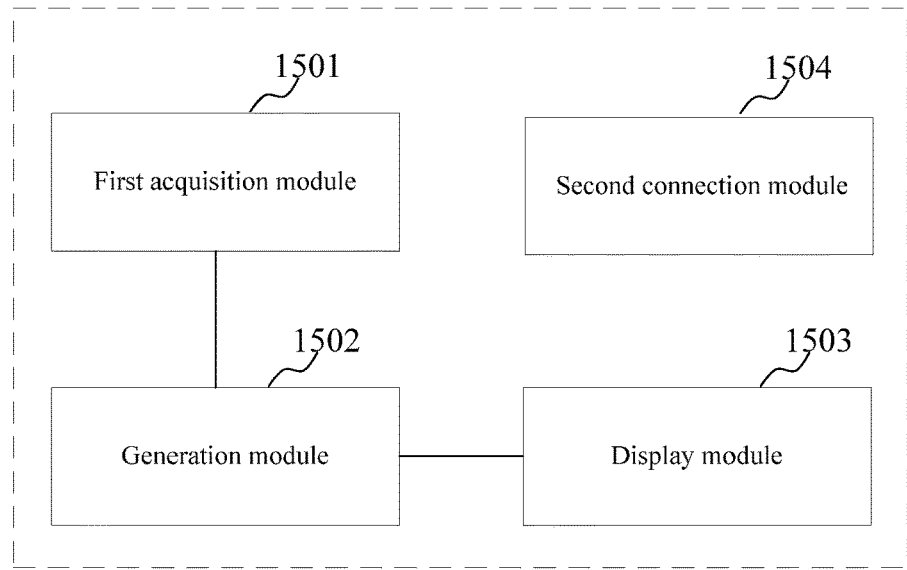
FIG. 15 is a block diagram showing an apparatus for establishing a wireless connection according to an exemplary embodiment.

FIG. 15 is a block diagram showing an apparatus for connection according to an exemplary embodiment. The apparatus may be applied to a second terminal device. Referring to FIG. 15, the apparatus includes: a first acquisition module 1501 configured to acquire an SSID and a connection password generated; a generation module 1502 configured to generate an image according to the SSID and the connection password in a predetermined manner, as an example, the image may be in form of a two-dimensional barcode; a display module 1503 configured to display the image on a screen of the second terminal device so that a first terminal device is able to acquire the SSID and the connection password and create a P2P group according to the SSID and the connection password; and a second connection module 1504 configured to connect with the P2P group created by the first terminal device according to the SSID and the connection password.

In the present embodiment or other embodiments of the present disclosure, the first acquisition module 1501 may be configured to acquire an SSID and a connection password which are preset.

Alternatively, the first acquisition module 1501 may be configured to receive an SSID and a connection password inputted by a user.

With regard to the apparatus in the above embodiment, detailed description of specific modes for conducting operation of modules has been made in the related method embodiment, thus, detailed illustration will be omitted herein.

Figure 16:
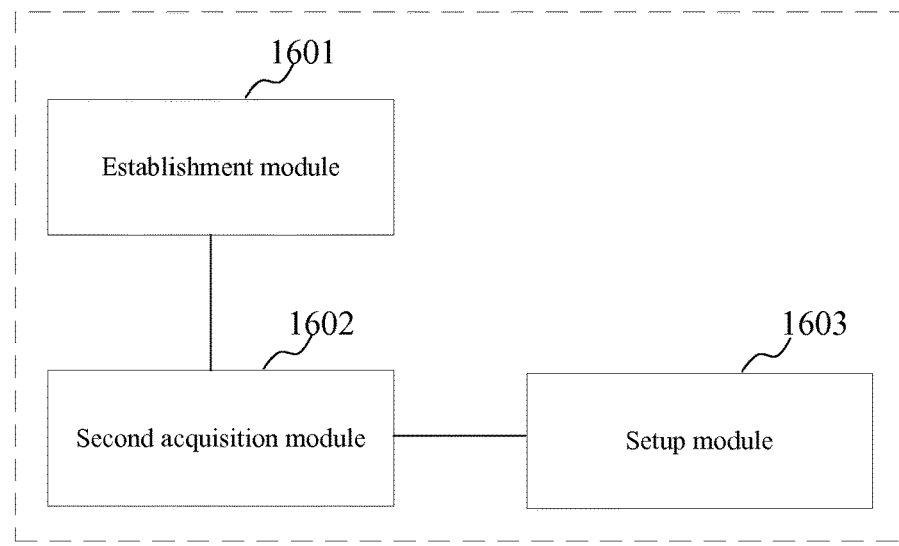
FIG. 16 is a block diagram showing an apparatus for establishing a wireless connection according to an exemplary embodiment.

FIG. 16 is a block diagram showing an apparatus for establishing a wireless connection according to an exemplary embodiment. The apparatus may be applied to a first terminal device. Referring to FIG. 16, the apparatus includes: an establishment module 1601 configured to create a P2P group; a second acquisition module 1602 configured to acquire an SSID and a connection password provided by the second terminal device; and a setup module 1603 configured to set both an SSID and a connection password of the P2P group as the SSID and the connection password provided by the second terminal device so that the second terminal device is able to connect to the first terminal device according to the SSID and the connection password.

Figure 17:
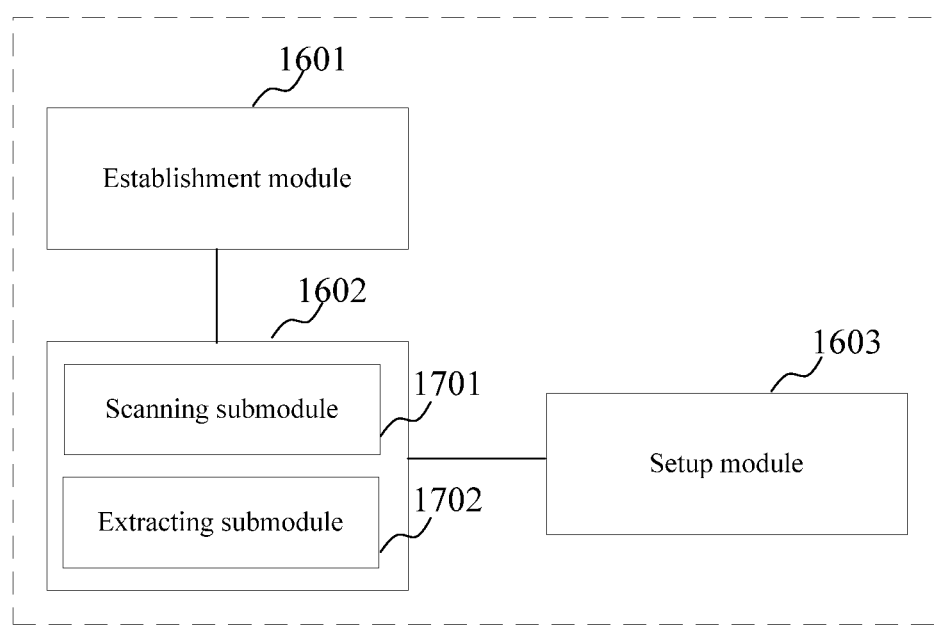
FIG. 17 is a block diagram showing an apparatus for establishing a wireless connection according to an exemplary embodiment.

Referring to FIG. 17, in the present embodiment or other embodiments of the present disclosure, the second acquisition module 1602 includes: a scanning submodule 1701, configured to scan an image displayed on a screen of the second terminal device in a predetermined manner, and the image is used to indicate the SSID and the connection password provided by the second terminal device; and an extracting submodule 1702, configured to extract the SSID and the connection password from the scanned image.

With regard to the device in the above embodiment, detailed description of specific modes for conducting operation of modules has been made in the related method embodiment, thus, detailed illustration will be omitted herein.

The present disclosure also discloses a first terminal device for establishing a wireless connection, including: a processor; and a memory configured to store instructions executable by the processor.

The processor is configured to: create a P2P group; determine an SSID and a connection password of the P2P group; and send both the SSID and the connection password to the second terminal device so that the second terminal device is able to connect to the first terminal device according to the SSID and the connection password.

The present disclosure also discloses a non-transitory computer-readable storage medium, wherein instructions in the storage medium are executed by a processor of a first terminal device so that the first terminal device may execute a method for establishing a wireless connection, and the method includes: creating a P2P group; determining an SSID and a connection password of the P2P group; and sending both the SSID and the connection password to the second terminal device so that the second terminal device is able to connect to the first terminal device according to the SSID and the connection password.

The present disclosure also discloses a second terminal device for establishing a wireless connection, including: a processor; and a memory configured to store instructions executable by the processor.

The processor is configured to: receive an SSID and a connection password sent by a first terminal device, and the SSID and the connection password are an SSID and a connection password of a P2P group created by the first terminal device; and connect to the first terminal device according to the SSID and the connection password.

The present disclosure also discloses a non-transitory computer-readable storage medium, wherein instructions in the storage medium are executed by a processor of a second terminal device so that the second terminal device may execute a method for establishing a wireless connection, and the method includes: receiving an SSID and a connection password sent by a first terminal device, the SSID and the connection password being an SSID and a connection password of the P2P group created by the first terminal device; and connecting with the first terminal device according to the SSID and the connection password.

The present disclosure also discloses a second terminal device for establishing a wireless connection, including: a processor; and a memory configured to store instructions executable by the processor.

The processor is configured to: generate an SSID and a connection password; display the SSID and the connection password in a predetermined manner so that a first terminal device is able to acquire the SSID and the connection password and create a P2P group according to the SSID and the connection password; and connect the P2P group created by the first terminal device according to the SSID and the connection password.

The present disclosure also discloses a non-transitory computer-readable storage medium, wherein instructions in the storage medium are executed by a processor of a second terminal device so that the second terminal device may execute a method for establishing a wireless connection, and the method includes: generating an SSID and a connection password; displaying the SSID and the connection password in a predetermined manner so that a first terminal device is able to acquire the SSID and the connection password and create a P2P group according to the SSID and the connection password; and connecting with the P2P group created by the first terminal device according to the SSID and the connection password.

The present disclosure also discloses a first terminal device for establishing a wireless connection, including: a processor; and a memory configured to store instructions executable by the processor.

The processor is configured to: acquire an SSID and a connection password provided by a second terminal device; create a P2P group; and set both an SSID and a connection password of the P2P group as the SSID and the connection password provided by the second terminal device so that the second terminal device is able to connect to the first terminal device according to the SSID and the connection password.

The present disclosure also discloses a non-transitory computer-readable storage medium, wherein instructions in the storage medium are executed by a processor of a first terminal device so that the first terminal device may execute a method for establishing a wireless connection, and the method includes: acquiring an SSID and a connection password provided by the second terminal device; creating a P2P group; setting both an SSID and a connection password of the P2P group as the SSID and the connection password provided by the second terminal device so that the second terminal device is able to connect to the first terminal device according to the SSID and the connection password.

Figure 18:
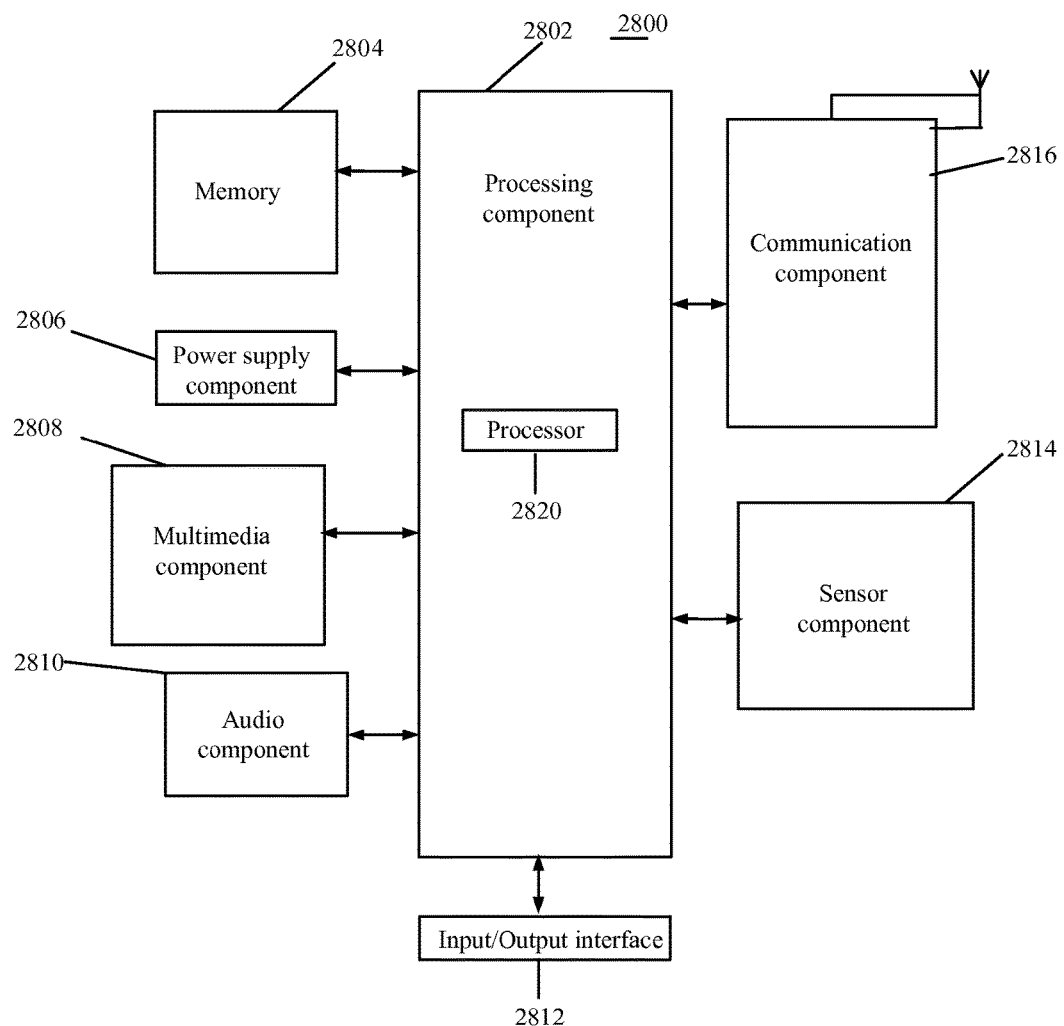
FIG. 18 is a block diagram showing a terminal device for establishing a wireless connection according to an exemplary embodiment.

FIG. 18 is a block diagram showing a terminal device for establishing a wireless connection according to an exemplary embodiment. For example, the terminal device 2800 may be a mobile telephone, a computer, a digital broadcasting terminal, a message transceiver device, a games console, a tablet device, a medical device, a fitness facility, a PDA (personal digital assistant) and the like.

Referring to FIG. 18, the terminal device 2800 may include one or more of the following components: a processing component 2802, a memory 2804, a power component 2806, a multimedia component 2808, an audio component 2810, an input/output (I/O) interface 2812, a sensor component 2814, and a communication component 2816.

The processing component 2802 typically controls overall operations of the terminal device 2800, such as the operations associated with display, telephone calls, data communications, camera operations, and recording operations. The processing component 2802 may include one or more processors 2820 to execute instructions to perform all or part of the steps in the above described methods. Moreover, the processing component 2802 may include one or more modules which facilitate the interaction between the processing component 2802 and other components. For instance, the processing component 2802 may include a multimedia module to facilitate the interaction between the multimedia component 2808 and the processing component 2802.

The memory 2804 is configured to store various types of data to support the operation of the terminal device 2800. Examples of such data include instructions for any applications or methods operated on the terminal device 2800, contact data, phonebook data, messages, pictures, video, etc. The memory 2804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2806 provides power to various components of the terminal device 2800. The power component 2806 may include a power management system, one or more power sources, and any other components associated with the generation, management, and distribution of power in the terminal device 2800.

The multimedia component 2808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 2810 is configured to output and/or input audio signals. For example, the audio component 2810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 2816. In some embodiments, the audio component 2810 further includes a speaker to output audio signals.

The I/O interface 2812 provides an interface between the processing component 2802 and peripheral interface modules, such as a keyboard, a click wheel, buttons, and the like. The buttons may include, but are not limited to, a home button, a volume button, a starting button, and a locking button.

The sensor component 2814 includes one or more sensors to provide status assessments of various aspects of the terminal device 2800. For instance, the sensor component 2814 may detect an open/closed status of the terminal device 2800, relative positioning of components, e.g., the display and the keypad, of the terminal device 2800, a change in position of the terminal device 2800 or a component of the terminal device 2800, a presence or absence of user contact with the terminal device 2800, an orientation or an acceleration/deceleration of the terminal device 2800, and a change in temperature of the terminal device 2800. The sensor component 2814 may include a proximity sensor configured to detect the presence of nearby objects without any physical contact. The sensor component 2814 may also include a light sensor, such as a CMOS or CCD image sensor, for use in imaging applications. In some embodiments, the sensor component 2814 may also include an accelerometer sensor, a gyroscope sensor, a magnetic sensor, a pressure sensor, or a temperature sensor.

The communication component 2816 is configured to facilitate communication, wired or wirelessly, between the terminal device 2800 and other devices. The terminal device 2800 can access a wireless network based on a communication standard, such as WiFi, 2G, or 3G, or a combination thereof. In one exemplary embodiment, the communication component 2816 receives a broadcast signal or broadcast associated information from an external broadcast management system via a broadcast channel. In one exemplary embodiment, the communication component 2816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 2800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 2804, executable by the processor 2820 in the terminal device 2800, for performing the above-described methods for establishing a wireless connection. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for establishing a wireless connection in a first terminal device, comprising:
 creating a peer-to-peer (P2P) group without disconnecting an existing wireless connection of the first terminal device;
 determining a Service Set Identifier (SSID) and a connection password of the P2P group; and
 sending the SSID and the connection password to a second terminal device by broadcasting a WIFI frame so that the second terminal device is able to directly connect to the pre-created P2P group according to the SSID and the connection password without search or negotiation process;
 wherein sending the SSID and the connection password to a second terminal device by broadcasting a WIFI frame comprises:
 the WIFI frame is a Probe Request frame, wherein the SSID and the connection password is placed in an SSID field of the Probe Request frame.

2. The method of claim 1, wherein determining the SSID and the connection password of the P2P group comprises:
 acquiring an SSID and a connection password generated randomly at the time of creating the P2P group; and
 determining the SSID and the connection password generated randomly as the SSID and the connection password of the P2P group.

3. The method of claim 1, wherein determining the SSID and the connection password of the P2P group comprises:
 acquiring an SSID and a connection password inputted from a user; and
 determining the SSID and the connection password inputted from the user as the SSID and the connection password of the P2P group.

4. The method of claim 1, wherein sending the SSID and the connection password to the second terminal device comprises:
 directly sending the SSID and the connection password to the second terminal device through a same local area network (LAN), a Bluetooth connection, or a near field communication (NFC) connection.

5. A method for establishing a wireless connection in a second terminal device, comprising:
 generating an SSID and a connection password;
 displaying the SSID and the connection password on a screen of the second terminal device in a predetermined manner so that a first terminal device is able to acquire the SSID and the connection password to create a P2P group according to the SSID and the connection password; and
 connecting with the P2P group pre-created by the first terminal device directly according to the SSID and the connection password received from the first terminal in the SSID field of a Probe Request frame without search or negotiation process.

6. The method of claim 5, wherein displaying the SSID and the connection password on a screen of the second terminal device in the predetermined manner comprises:
 displaying the SSID and the connection password on the screen of the second terminal device in a form of a two-dimensional barcode.

7. A method for establishing a wireless connection in a first terminal device, comprising:
 acquiring an SSID and a connection password displayed on a screen of a second terminal device;
 creating a P2P group without disconnecting an existing wireless connection of the first terminal device; and
 setting an SSID and a connection password of the P2P group as the SSID and the connection password provided from the second terminal device so that the second terminal device is able to directly connect to the pre-created P2P group according to the SSID and the connection password.

8. The method of claim 7, wherein acquiring the SSID and the connection password displayed by the second terminal device comprises:
 capturing an image displayed on the screen of the second terminal device in a predetermined manner, wherein the image indicates the SSID and the connection password provided from the second terminal device; and extracting the SSID and the connection password from the image captured.

9. The method of claim 8, wherein the image are in a form of a two-dimensional barcode.

10. A first terminal device for establishing a wireless connection, comprising:

a processor; and a memory configured to store instructions executable by the processor;

wherein, the processor is configured to perform:

creating a peer-to-peer (P2P) group without disconnecting an existing wireless connection of the first terminal device;

determining a Service Set Identifier (SSID) and a connection password of the P2P group; and sending the SSID and the connection password to a second terminal device by broadcasting a WIFI frame so that the second terminal device is able to directly connect to the pre-created P2P group according to the SSID and the connection password without search or negotiation process;

wherein sending the SSID and the connection password to a second terminal device by broadcasting a WIFI frame comprises:

the WIFI frame is a Probe Request frame, wherein the SSID and the connection password is placed in an SSID field of the Probe Request frame.

11. The first terminal device of claim 10, wherein determining the SSID and the connection password of the P2P group comprises:

acquiring an SSID and a connection password generated randomly at the time of creating the P2P group; and determining the SSID and the connection password generated randomly as the SSID and the connection password of the P2P group.

12. The first terminal device of claim 10, wherein determining the SSID and the connection password of the P2P group comprises:

acquiring an SSID and a connection password inputted from a user; and determining the SSID and the connection password inputted from the user as the SSID and the connection password of the P2P group.

13. The first terminal device of claim 10, wherein sending the SSID and the connection password to the second terminal device comprises:

directly sending the SSID and the connection password to the second terminal device through a same local area network (LAN), a Bluetooth connection, or a near field communication (NFC) connection.

14. A second terminal device for establishing a wireless connection, comprising:

a processor; and a memory configured to store instructions executable by the processor;

wherein, the processor is configured to perform:

generating an SSID and a connection password;

displaying the SSID and the connection password on a screen of the second terminal device in a predetermined manner so that a first terminal device is able to acquire the SSID and the connection password to create a P2P group according to the SSID and the connection password; and connecting with the P2P group pre-created by the first terminal device directly according to the SSID and the connection password received from the first terminal in the SSID field of a Probe Request frame without search or negotiation process.

15. The second terminal device of claim 14, wherein displaying the SSID and the connection password on a screen of the second terminal device comprises:

displaying the SSID and the connection password on the screen of the second terminal device in a form of a two-dimensional barcode.

16. A first terminal device for establishing a wireless connection, comprising:

a processor; and a memory configured to store instructions executable by the processor;

wherein, the processor is configured to perform:

acquiring an SSID and a connection password displayed on a screen of a second terminal device;

creating a P2P group without disconnecting an existing wireless connection of the first terminal device; and setting an SSID and a connection password of the P2P group as the SSID and the connection password provided from the second terminal device so that the second terminal device is able to directly connect to the pre-created P2P group according to the SSID and the connection password without search or negotiation process.

17. The first terminal device of claim 16, wherein acquiring the SSID and the connection password displayed on a screen of the second terminal device comprises:

capturing an image displayed on the screen of the second terminal device in a predetermined manner, wherein the image indicates the SSID and the connection password provided from the second terminal device; and extracting the SSID and the connection password from the image captured.

18. The first terminal device of claim 17, wherein the image are in a form of a two-dimensional barcode.

* * * * *